United States Patent [19]

Bolton et al.

[11] 4,247,339

[45] Jan. 27, 1981

[54] PAINT COMPOSITIONS

[75] Inventors: Terence W. Bolton, Worthing; John A. Eggleden, Storrington; David A. Alexander, Twickenham, all of England

[73] Assignee: Magic Brush Limited, Worthing, England

[21] Appl. No.: 973,632

[22] Filed: Dec. 27, 1978

[30] Foreign Application Priority Data

Jan. 6, 1978 [GB] United Kingdom ............... 542/78

[51] Int. Cl.³ .................... C09D 1/00; C09D 5/04
[52] U.S. Cl. .................... 106/308 B; 106/20; 106/24
[58] Field of Search ............ 106/252, 253, 308 B, 106/308 N, 308 Q, 288 R, 288 B, 20, 24; 252/352

[56] References Cited

U.S. PATENT DOCUMENTS

| 2,622,987 | 12/1952 | Ratcliffe | 106/253 |
| 2,885,360 | 5/1959 | Haden et al. | 106/253 |
| 3,067,053 | 12/1962 | Tarantino | 106/309 |
| 3,864,294 | 2/1975 | Busch | 106/308 B |
| 4,034,129 | 7/1977 | Kittle | 106/74 X |
| 4,062,694 | 12/1977 | Sawyer | 106/288 B |

*Primary Examiner*—G. O. Peters
*Attorney, Agent, or Firm*—Bacon & Thomas

[57] ABSTRACT

A paint suitable for use in a fountain brush comprising up to 5% by weight of a pigment dispersed in an aqueous medium containing a suspending agent and a surfactant dispersing agent; the paint exhibits advantageous properties used in a fountain brush comprising a brush, a reservoir containing the paint and flow-restricting means for regulating the flow of paint. The preferred suspending agent is hectorite.

11 Claims, 7 Drawing Figures

U.S. Patent   Jan. 27, 1981   Sheet 1 of 3   4,247,339
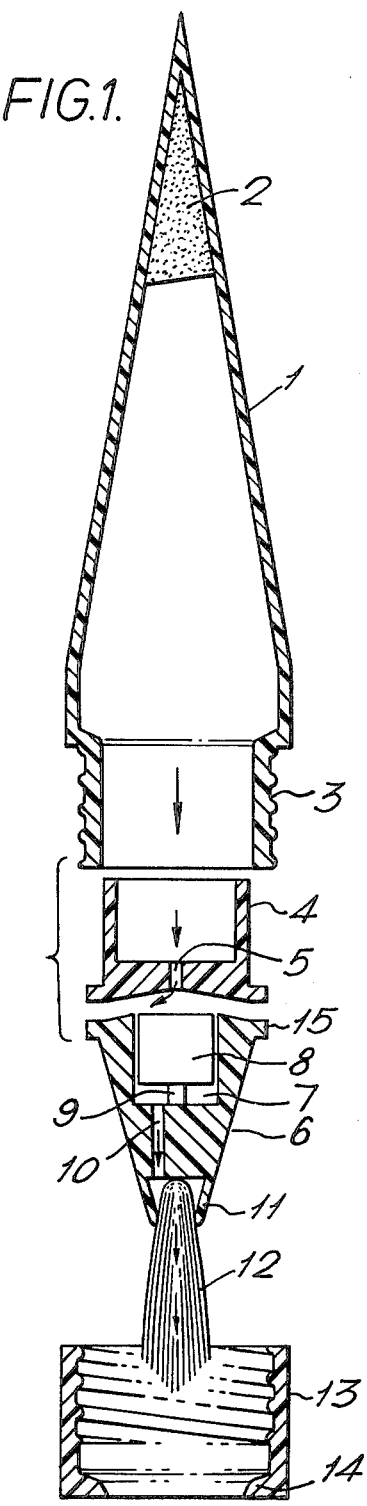
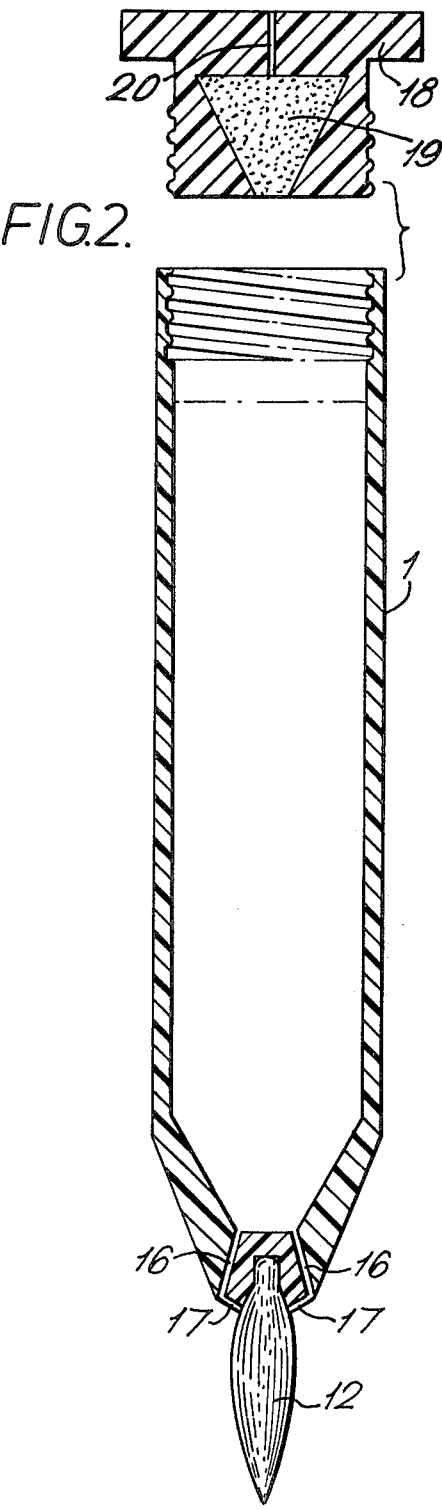

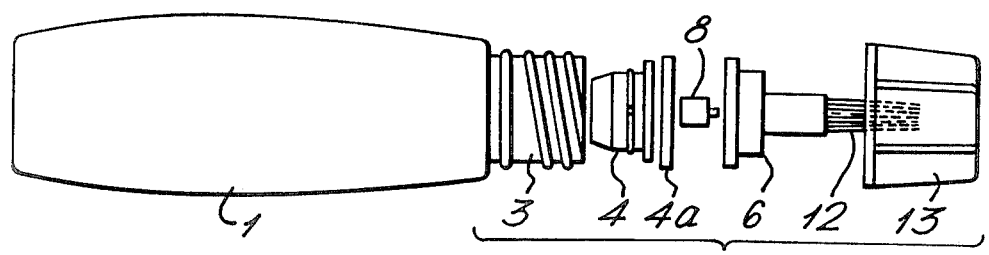
FIG.3.
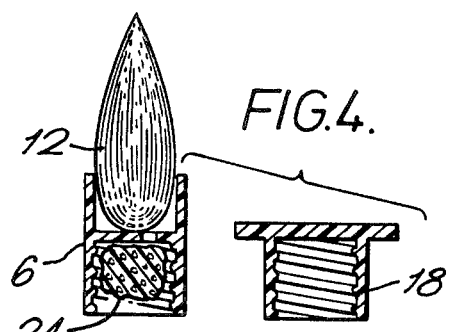
FIG.4.
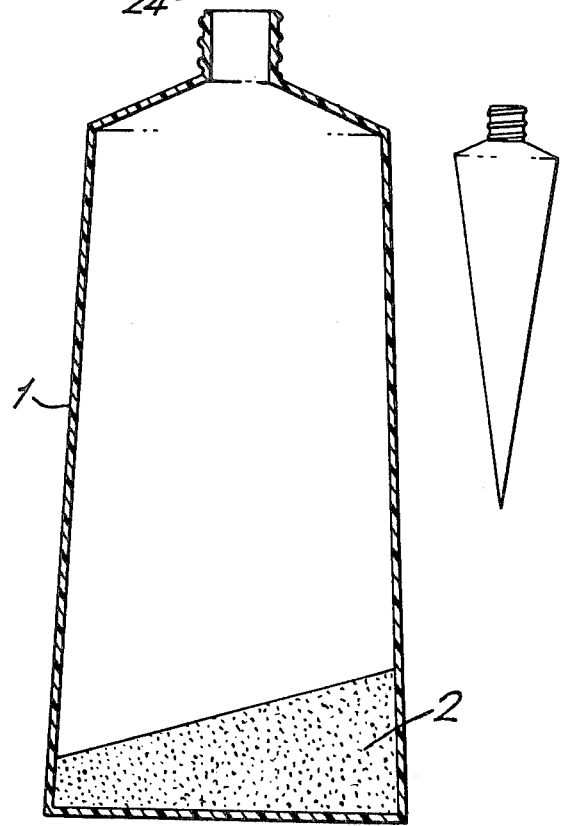

PAINT COMPOSITIONS

This invention is concerned with paint compositions and fountain brushes containing them, such brushes being attached to a reservoir which contains a supply of painting medium.

The brushes previously used for painting have required to be dipped at frequent intervals into a supply of paint, contained on a palette or in a paint pot. This process is time-consuming and makes it difficult to apply the paint in an even manner. Immediately after the brush has been recharged, there is a tendency for the paint to be applied more thickly, and as the brush becomes exhausted, the paint is applied more and more sparingly. Thus if one desires to apply a paint film of constant thickness, skilful allowance must be made for this factor. The supply of paint, whether on a palette or in a pot, is liable to cause a mess by spillage or by accidental contact with the painter's clothes, and frequently it has to be mixed immediately before use.

Although paint has been used for centuries, to our knowledge no way of mitigating these problems has achieved any practical success. Indeed, it is simply accepted that painting is a messy activity during which paint will be deposited in many undesired places, particularly when young children are involved.

Attempts have been made to produce so-called fountain brushes or reservoir brushes (e.g. British Pat. No. 202,205), but these have encountered serious practical problems such as leakage of paint, sedimentation, flooding of the brush, drying out and caking of the brush, poor range of colours, poor brushability and poor hold-out. By brushability we mean the ability to spread the paint evenly over an area of the painting surface to a desired thickness, and by hold-out we mean the ability of the paint to remain on a porous surface such as paper and dry there without penetrating through the surface and spreading laterally by capillary action. As a result of these problems, the fountain brush has not achieved any commercial importance and has never challenged the conventional brush in the same way as the fountain pen has largely replaced other forms of pen. Although much ingenuity has been exercised in the mechanical construction of fountain brushes (e.g. British Pat. No. 1,266,514), it has never previously been appreciated that the paint formulation is critical to the successful operation of a fountain brush. Conventional oil or water-based paints do not work satisfactorily in a fountain brush.

The paint of our invention contains a very low concentration of pigment, not more than 5% by weight, dispersed in an aqueous medium containing a suspending agent and a surfactant dispersing agent.

Suspending agents have previously been used in aqueous-based paint formulations to confer non-drip properties (e.g. U.S. Pat. No. 4,021,389 and British Pat. No. 1,013,367) but these formulations have contained much higher pigment loadings above 20% by weight.

The paint is an aqueous dispersion of pigment. This has better brushability and hold-out than an ink, and in a transluscent reservoir it appears approximately the same colour as after application. All inks appear nearly black before application, irrespective of their actual colour. The paint contains a suspending agent, preferably a thixotropic suspending agent, to control sedimentation, and improve hold-out and brushability. The use of a thixotropic suspending agent enables the dynamic viscosity of the paint to be low enough for easy flow to the brush; in the reservoir and after application the paint has a very weak gel structure which controls sedimentation and hold-out.

The preferred suspending agent is a thixotropic clay, i.e. a swelling clay which confers thixotropic properties on aqueous systems. Thixotropic clays include bentonite and montmorillonite but we particularly prefer hectorite, either in its natural form or more preferably of synthetic origin. A typical analysis by weight for synthetic hectorite is: $SiO_2$ 55–56%, MgO 26–27%, $Na_2O$ about 4%, $Li_2O$ about 2%, F about 5%, structural water 6–7%. The F may be replaced wholly or in part by OH. The use of hectorite enables formulation of paints which have excellent washability, that is, they can be removed from clothing or the like by normal washing processes. The choice of pigment is of course also important in obtaining satisfactory washability.

Less preferred suspending agents include polyvinylpyrrolidone and polysaccharide gums.

The proportion of suspending agent should be selected to give the required balance of properties to the paint; too little of this material will allow sedimentation of the pigment and cause poor hold-out and brushability. Too much suspending agent will not permit free flow of the paint to the brush. Suitable concentrations of hectorite are in the range 0.1–3 weight %, preferably 0.5–1.5 weight %. The paint in the reservoir should never set to a rigid gel but should be sufficiently structured to control sedimentation and improve hold-out. After standing undisturbed, the paint may e.g. have a consistency approximating to that of treacle, but on gentle shaking the structure is immediately broken down. Likewise on passing from the reservoir to the brush head the structure is temporarily broken down, but tends to reform rapidly after application. The dynamic viscosity of the paint may be as high as 10 poise but is more preferably below 3 poise and advantageously below 1 poise. A simple test will establish a suitable concentration for any given thixotropic suspending agent.

The concentration of pigment in the paint should be adequate to give the required intensity of colour, but an excess of pigment can cause caking of the brush and difficulty in rewetting the brush after it has dried out. In constrast to conventional water-based paints such as poster colour or water colour, the paint used according to the invention contains a very low concentration of pigment, i.e. not more than 5% by weight, preferably not more than 3% by weight. Generally 0.15–2.5 weight %, more preferably 0.5–1.6 weight % of pigment will be satisfactory.

A surfactant dispersing agent will be necessary to disperse hydrophobic pigments. The type and concentration of dispersing agent should be selected in accordance with the physical properties of the pigment; advice on this matter is generally obtainable from the manufacturers of the selected pigment. Often an anionic or nonionic surfactant or a mixture of these will be used, for example in an amount of 5–100% by weight of the pigment. Some surfactant is necessary to disperse a hydrophobic pigment but the nature and concentration of the surfactant is not critical to the success of the paint formulation. To reduce frothing of the paint a defoaming agent may be included in the paint formulation. A minor proportion of an organic solvent may also be included in the aqueous vehicle.

It is preferred that the paint is substantially non-toxic to increase operational safety to children.

Typical formulations of paint according to this invention are as follows:

| Formulation 1, blue | % by weight |
|---|---|
| Laponite B | 1.2 |
| Unisperse Blue G-E | 2.0 |
| Defoamer (Bevaloid 581 B) | 0.025 |
| Water to | 100 |

Laponite B is a synthetic hectorite sold by Laporte Industries Ltd. as a thixotropic suspending agent. Its analysis, on a dry basis in weight % is: $SiO_2$ 55.6; MgO 26.4; $Na_2O$ 4.0; $Li_2O$ 2.0; F 5.2; structural $H_2O$ 6.8%.

Unisperse pigments are available from Ciba-Geigy Ltd. They comprise 35–65 weight % of pigment, up to 30% surfactant (dispersing agent) and up to 20% ethylene glycol. Bevaloid 581 B is a non-toxic defoaming agent sold by Bevaloid Ltd., Beverley, Yorks.

Formulation 2, yellow

As formulation 1 but Unisperse Yellow G-E (2.0%) replaces Unisperse Blue G-E.

Formulation 3, green

As formulation 1, but Unisperse Yellow 10 G-E (0.75%) and Unisperse Green G-E (1.25%) replace Unisperse Blue G-E.

Formulation 4, red

As formulation 1, but Unisperse Red 3 RS-E (2.0%) replaces Unisperse Blue G-E.

The formulations are preferably made up by dispersing 0.5 part by weight of the defoamer in 59.5 parts of water, adding 40 parts of the pigment and stirring until a homogeneous paint concentrate is obtained. One part of this concentrate is then added to 19 parts of water gelled with the Laponite and stirred to form the final paint formulation. Excessive hardness in the water will adversely affect the properties of the Laponite.

These formulations have excellent hold-out and brushability. They can be applied evenly to cartridge paper of normal quality without striking through or wicking. Because the pigment remains on the surface of the paper it appears particularly brilliant. The paints can be removed from most fabrics by normal washing procedures. As a result of their low pigment content (less than 1.3% by weight) the paint formulations do not cake in the brush and readily rewet the brush even when it has dried out completely. They resist sedimentation, even in a centrifuge. Their dynamic viscosity is less than 1 poise at 10,000 $sec^{-1}$. They have a low tendency to flood the brush or cause leakage or drips.

Another aspect of our invention provides a painting instrument comprising a brush, a reservoir containing the paint defined above, and flow restricting means for regulating the flow of paint from said reservoir to said brush.

The reservoir preferably forms a handle for the painting instrument. It is conveniently made of a plastics material which preferably is transparent or translucent so that the level of paint within may be seen.

The reservoir may be of any convenient shape, e.g. cylindrical, polygonal or shaped like a collapsible tube of paint. It should be designed to be held conveniently in the hand.

At least part of the reservoir may be deformable, so that paint may be squeezed out of the reservoir to supply the brush. Depending on the resistance of the flow restricting means, it may be advisable to limit the reduction in volume obtainable by squeezing, since otherwise an excessive quantity of paint may be discharged. Thus the walls of the reservoir may be made sufficiently thick that the user (e.g. a child) is not likely to deform them very far, or only a small portion of the reservoir may be deformable, or there may be a non-deformable structure within the reservoir to limit the deformation of its walls. The reservoir may contain a porous material such as open-celled plastics foam to hold the paint and regulate its discharge from the reservoir.

The amount of paint reaching the brush is further controlled by flow restricting means, which effectively limit the flow of paint to a rate at which the brush will not become flooded. A preferred flow restricting means comprises a plug located in a housing, the outer peripheral surface of said plug having at least one metering channel through which paint can flow between said plug and its housing. Preferably said plug comprises a spigot to space it from an end wall of said housing. The plug and its housing may be of plastics material. With this form of flow restricting means it is very unlikely that too much paint will be discharged by prolonged or repeated squeezing of the reservoir. This form of flow restricting means is the subject of British Pat. No. 1,502,942.

In another embodiment, a construction of labarynthine form is used, such as a piece of open-celled porous material, especially plastics foam.

As liquid is discharged from the reservoir, air must take its place (unless the reservoir is designed to be collapsible). The air may enter through or adjacent the brush, or through an orifice provided for the purpose in the reservoir. The orifice may be permanently open, in which case the paint will tend to flow under gravity down to the brush (aided by capillary attraction) and squeezing of the reservoir will generally not be required. Alternatively the orifice may be closed by a valve which is openable manually to admit air to the reservoir, and hence to allow liquid to be discharged therefrom. The valve may be openable by pressure from the user's finger or thumb, or by turning or sliding a sealing member so that the orifice is uncovered.

When a flow restricting means in the form of a piece of open-celled porous material is present, this tends to control the entry of air into the reservoir automatically. When the porous material is saturated with paint, air cannot enter the reservoir. As the paint is discharged via the brush, the pores are no longer flooded and air can pass into the reservoir to allow more paint to flow out. The same action is observed with the preferred form of flow restricting means described above.

The flow restricting means may comprise valve means which can be closed to prevent passage of paint from the reservoir to the brush, e.g. operated by relative rotation between a brush head portion and a reservoir portion of the painting instrument.

The paint is preferably supplied through the base of said brush. Alternatively it may be supplied from one or more apertures adjacent the base of the brush, from which apertures it finds its way onto the bristles.

The brush itself is of suitable fibrous material, either natural or synthetic. Suitable natural fibers include those conventionally used for brush-making, such as hog's hair, squirrel hair and goat hair. Synthetic fibres include polyamide fibres, particularly nylon of suitable grade, preferably having a thickness in the range 0.004–0.006 inch (0.010–0.015 mm).

When the paint is to be supplied through the brush, it is not advisable to glue the fibres together at the base of the brush, since this will unduly obstruct the flow of paint. In such a construction one or more channels around the base of the brush or one or more bores through it may be provided for the paint. We prefer, however, a cheap and efficient construction, particularly suitable for use with synthetic fibres, in which the fibres are looped at their middle point, cinched together with a staple or other fixing means, and the looped fibres inserted into a tubular ferrule.

It will be understood that the brush employed in the painting instrument of the present invention comprises non-compacted fibres, and in no way resembles the fibrous nibs which have been used as writing instruments.

In one embodiment of our invention, the whole painting instrument is disposable. The reservoir is charged with paint and is sold attached to the brush. When the reservoir is exhausted, the instrument is thrown away.

Preferably, however, the reservoir is replaceable or rechargeable. To permit recharging to take place, the reservoir is provided with an aperture sealed with a detachable cover. Conveniently the cover comprises the brush head, so that by detaching the brush head from the reservoir one is enabled to recharge the reservoir. The two portions may be attached by screw thread means or by a resilient snap connection. Alternatively the reservoir may be recharged through a detachable end cap or plug.

In one embodiment of our invention, the reservoir is recharged with paint from a bulk supply of paint. This however is a messy operation. According to another embodiment, the reservoir is recharged with water and the paint is generated inside the painting instrument by dispersion of a paint concentrate contained therein. There are many ways in which the water and paint concentrate may be brought together.

For example, one may add paint concentrate in the form of powder, granules or a pellet to the reservoir before or after filling it with water. Alternatively the paint concentrate may be contained in a filler cap or plug which seals the aperture through which the reservoir is filled. The filler cap or plug may be disposable. Thus the user never comes into contact with the paint concentrate, and by the time the reservoir is exhausted, there is practically no paint left in the instrument which could cause a spillage.

Another embodiment uses a disposable reservoir which already contains liquid paint or which may contain a paint concentrate in the form of crystals, paste, or other suitable form, e.g. adsorbed on plastics foam. The reservoir is filled with water up to an indicated level, the brush head is attached, and the instrument is shaken to disperse the paint concentrate into the water. With this embodiment also, the recharging process should not involve any risk of spilling liquid paint.

The painting instrument of the present invention is mainly intended for artistic use, but is clearly applicable to other painting and marking uses such as sign-writing, model-making, domestic painting and other operations in which comparatively small volumes of paint are employed.

Five embodiments of our invention will now be described by way of illustrated only with reference to the accompanying drawings, wherein:

FIG. 1 illustrates in cross-sectional exploded view a first embodiment of the present invention;

FIG. 2 illustrates in cross-section a second embodiment wherein the paint concentrate is contained in a filler cap for the reservoir;

FIG. 3 illustrates an exploded view of a preferred embodiment of our invention;

FIG. 4 illustrates in cross-section a further embodiment in disassembled form, a side view of the reservoir being shown inset;

FIG. 5b is a cross-section through the reservoir designed to co-operate with the brush head of FIG. 5a.

Figure 5A:
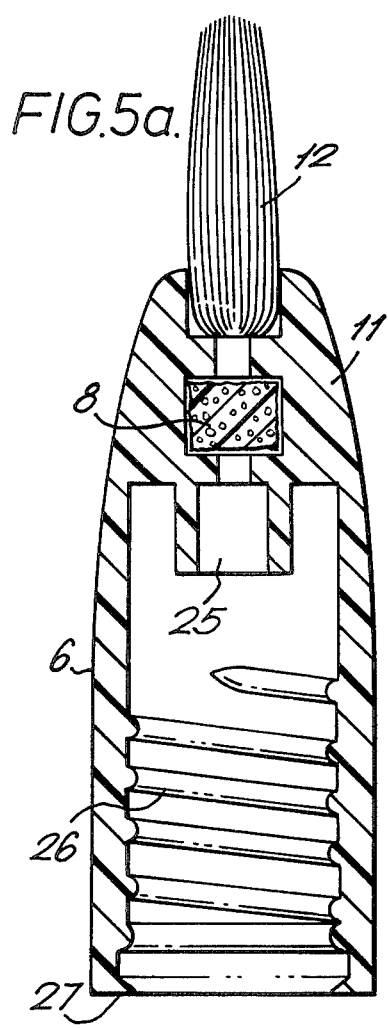
FIG. 5a is a cross-section through the brush head of a painting instrument having valve means which can be closed to prevent the passage of fluid from the reservoir to the brush.

Each embodiment contains a paint corresponding to one of the formulations 1–4 above.

Referring now to FIG. 1, there is shown the reservoir 1 formed of translucent plastics material. Before use of the painting instrument, dry paint concentrate 2 is packed into the narrow end of the reservoir.

The reservoir is provided with an externally threaded portion 3.

A bung 4 seats within the open end of the reservoir 1. The bung 4 is provided with a central bore 5.

The brush head 6 comprises a blind bore 7 which closely surrounds a cylindrical flow restricting plug 8 which is provided with an axially projecting spigot 9. The outer peripheral surface of the plug 8 has at least one metering channel through which paint can flow between the plug 8 and the bore 7 which serves as a housing. A passage 10 extends from the bore 7 to the ferrule 11 which engages the brush 12. The spigot 9 prevents the plug 8 from blocking passage 10. The brush 12 comprises looped nylon fibres cinched at their midpoint by a staple and then pushed into ferrule 11.

In order to prepare the painting instrument for use, water is poured into the reservoir 1 until it is practically full. The bung 4 is then inserted, the brush head 6 is placed on top, and the gland nut 13 is placed over the brush head and tightened onto the threaded portion 3 of the reservoir. A shoulder 14 on the gland nut then engages portion 15 of the brush head so that a water-tight seal is made. All of the parts of the painting instrument may be made of plastics material of suitable grade.

The instrument is then shaken to disperse the paint concentrate 2 into the water. On squeezing the reservoir 1 gently, paint is forced through the bore 5, through the metering channel in plug 8, subsequently into passage 10, and finally through the brush 12. The instrument is now ready for use.

A dust cap (not shown) may be provided to engage the gland nut 13 externally and so protect the brush 12 from damage and from drying out when the instrument is not in use.

Referring now to FIG. 2, the reservoir 1 is of generally cylindrical form, tapering at one end. At the tapered end, passageways 16 and channels 17 are arranged to lead paint to the brush 12.

The other end of the reservoir engages by means of a screw thread with the cap 18 which, before use of the instrument, contains dry paint concentrate in the undercut recess 19.

To prepare the instrument for use, the reservoir is nearly filled with water, the cap 18 is screwed on, and the instrument is shaken until the paint concentrate has dispersed into the water. This procedure also opens a fine bore 20, whose purpose is to admit air to the reservoir. Paint can then flow onto the brush 12. Instead of the arrangement shown, paint may be supplied through the brush as in the device of FIG. 1.

When the reservoir is exhausted, it is again filled with water and a new cap 18 containing a fresh supply of paint concentrate is attached.

FIG. 3 illustrates a modification of the embodiment of FIG. 1. The reservoir 1 contains premixed paint which is retained by bung 4. Bung 4 comprises a diaphragm which is pierced or ruptured before use with a suitable sharp instrument. The brush head 6 has a metering plug 8 and nylon brush 12 (shown partly in ghost) and is assembled to the reservoir by gland nut 13. An impermeable sealing disc 4a is provided to reseal the reservoir, if desired, when the instrument is being transported or stored for considerable periods of time. When the paint in reservoir 1 is exhausted, the whole reservoir is replaced; the reservoir 1 has a flat end portion to enable the instrument to stand on a level surface.

In FIG. 4 the reservoir 1 is of deformable plastics material and is shaped like a conventional tube of paint. The reservoir contains dry paint concentrate 2 and until use is sealed by the screw cap 18. After adding water and shaking to disperse the paint concentration, the user screws on the brush head 6. The lip of the reservoir 1 then abuts against and compresses the open-called plastics foam insert 24 which serves to regulate the flow of paint to the brush 12. The brush 12 is of the type shown in FIG. 1. A dust cap (not shown) is provided to protect the brush when not in use.

Referring now to FIG. 5a, the brush head 6 comprises a brush 12 inserted into a ferrule 11. A piece of open-celled plastics foam 8 is provided to restrict the flow of paint to the brush 12. The bore by which paint reaches the brush comprises an enlarged portion 25. The brush head 6 is attached to the reservoir by an internal thread 26 which is of coarse pitch and may be of single-start or multi-start type. A retaining lip 27 is provided at or adjacent the open end of the brush head.

Figure 5C:
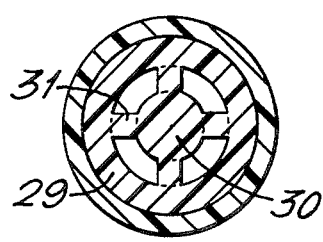
FIG. 5c is a cross-section along the line A–B of FIG. 2.
Figure 5B:
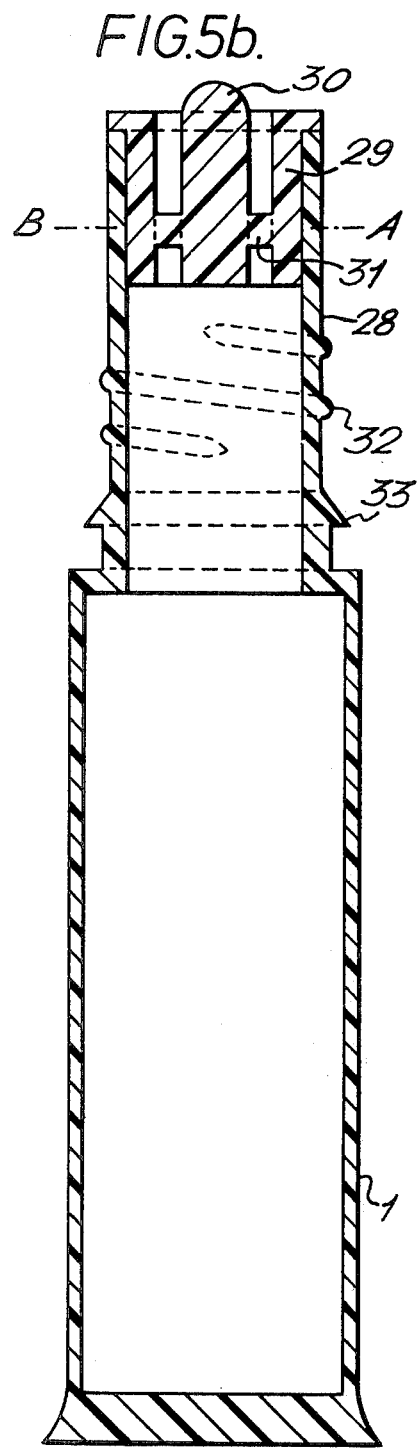

The reservoir (FIG. 5b) comprises a flexible portion 1 which may be squeezed to expel paint from the reservoir and a nozzle portion 28 in which plug 29 is a tight push fit. The plug 29 comprises a projecting portion 30 attached thereto by four webs 31 (see FIG. 5c). The nozzle 28 has an external thread 32 along part of its length and a retaining flange 33.

In order to prepare the painting instrument for use, the reservoir 1 is filled with paint, suitably by immersing the nozzle 28 into a pot of paint and repeatedly squeezing the reservoir until all air is expelled. The nozzle 28 is then assembled to the brush head 6 by means of the screw threads 26 and 32. On screwing the two portions together, the retaining lip 27 overrides the flange 33, thus preventing accidental disassembly. In this position, paint can flow through the plug 29 and bore 25 to the brush 12. The nozzle 28 is a close fit within the brush head 6, and paint cannot leak out between the two parts.

If clockwise rotation between the two portions continues, the projection 30 enters the bore 25 and seals off the reservoir from the brush head. The instrument can then be transported, stored or shaken without loss of paint from the reservoir. Thus a simple twist action suffices to turn off the supply of paint or to turn it on again.

The embodiments of FIGS. 1–5 are suitably made of a thermoplastics material.

We claim:

1. A paint suitable for use in a fountain brush consisting essentially of up to 5% by weight of a pigment dispersed in an aqueous medium containing a thixotropic suspending agent, which gives said paint a weak gel structure, and an amount of a surfactant dispersing agent sufficient to disperse any hydrophobic pigments in said paint.

2. The paint of claim 1 wherein said thixotropic suspending agent is a thixotropic clay.

3. The paint of claim 2 wherein said thixotropic clay is hectorite.

4. The paint of claim 3 wherein said hectorite is a synthetic hectorite having the approximate composition by weight % of: 55–56% of $SiO_2$: 26–27% of MgO; about 4% of $Na_2O$; about 2% of $Li_2O$; about 5% of F; and about 6–7% of structural $H_2O$.

5. The paint of claim 3 wherein the concentration of hectorite in said paint is 0.1–3 weight %.

6. The paint of claim 5 wherein the said concentration of hectorite is 0.5–1.5 weight %.

7. The paint of claim 1 wherein the concentration of said pigment in said paint is not more than 3 weight %.

8. The paint of claim 7 wherein said concentration of pigment is 0.15–2.5 weight %.

9. The paint of claim 8 wherein said concentration of pigment is 0.5–1.6 weight %.

10. The paint of claim 1 having a dynamic viscosity of less than 1 poise.

11. The paint of claim 1 wherein said thixotropic suspending agent is hectorite and said hectorite is present in a concentration of about 0.5–1.5 weight %, said pigment is present in a concentration of about 0.5–1.6 weight %, and said paint has a dynamic viscosity of less than 1 poise.

* * * * *